United States Patent [19]

Hassenplug

[11] Patent Number: 4,809,007

[45] Date of Patent: Feb. 28, 1989

[54] NAVIGATION METHOD

[75] Inventor: Wolfgang Hassenplug, Freiburg, Fed. Rep. of Germany

[73] Assignee: Litef GmbH, Breisgau, Fed. Rep. of Germany

[21] Appl. No.: 20,851

[22] Filed: Mar. 2, 1987

[30] Foreign Application Priority Data

Mar. 3, 1986 [EP] European Pat. Off. ........ 86102742.3

[51] Int. Cl.⁴ .............................................. G01S 5/02
[52] U.S. Cl. .................................. 342/417; 342/448; 364/453
[58] Field of Search ................ 342/417, 448; 364/453; 244/3.2

[56] References Cited

U.S. PATENT DOCUMENTS 2,776,428  1/1957  Hassler et al. ............... 342/417
3,456,255  7/1969  Wieland et al. ............. 342/417

Primary Examiner—Theodore M. Blum
Attorney, Agent, or Firm—Elliott N. Kramsky

[57] ABSTRACT

A navigation method for independently determining direction and for determining course for aircraft with low quality gyros and an external, calibrated magnetic course sensor. The method, which functions in the event of failure of the magnetic course sensor, is based upon the concept of determining, from the magnetic course last determined prior to failure as corrected by the local declination, and the true course as determined by the quotient of the two gyro horizontal axes distorted by the gyro drift, a "synthetic magnetic course" for course support.

6 Claims, 1 Drawing Sheet

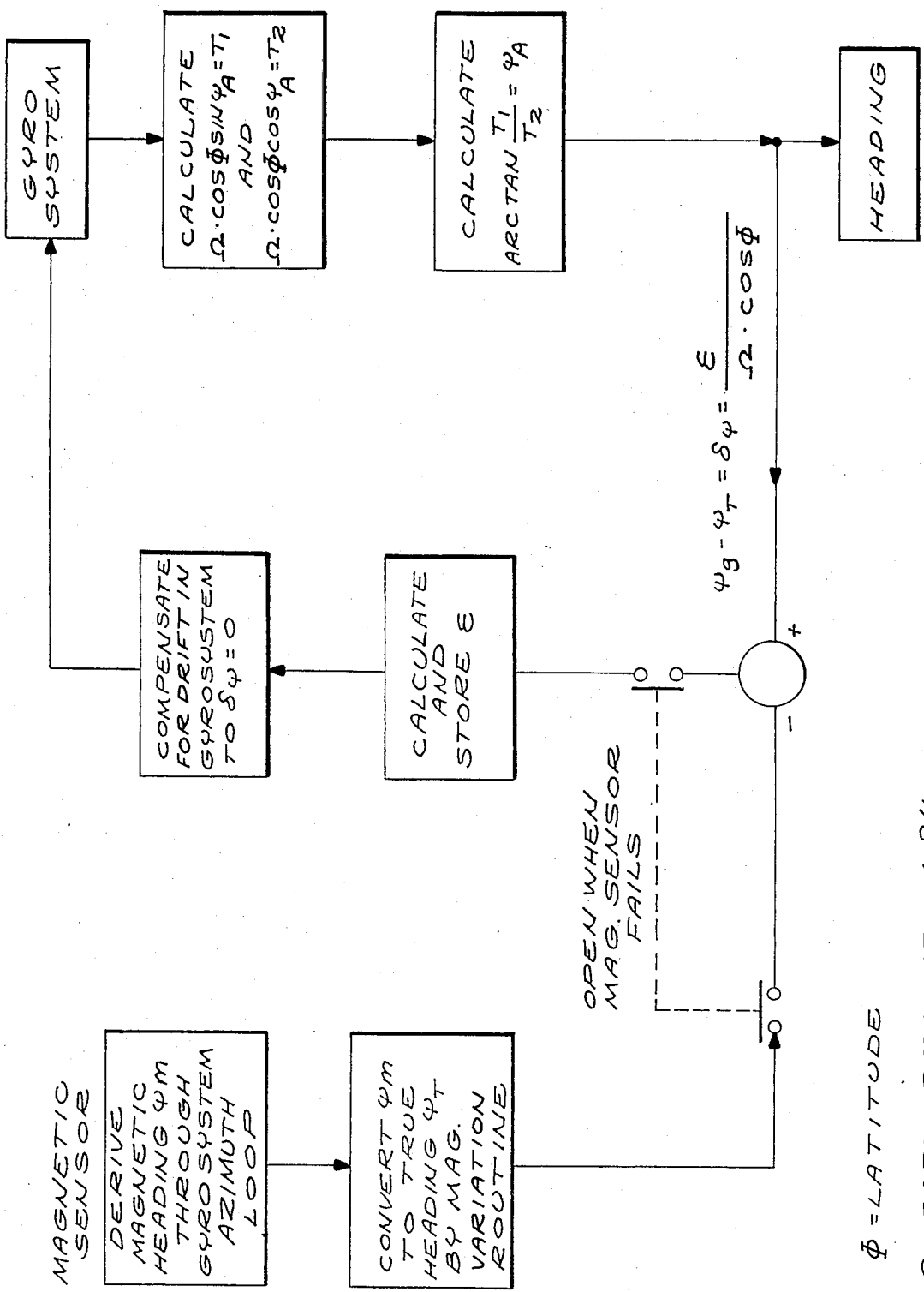

NAVIGATION METHOD

BACKGROUND

1. Field of the Invention

The present invention relates to navigation methods. More particularly, this invention pertains to the navigation of aircraft equipped with high drift gyros for determining course which utilize an external course sensor that is subject to failure.

2. Background of the Prior Art

Course-and speed-supported inertial systems are employed in a number of aircraft. Often such systems employ relatively poor quality (large-drift gyros). An external course snsor such as a magnetic field detector (e.g. three-axis magnetometer) is employed for course support. In such systems, if the course support should fail, course and, thus, navigation error rapidly grow to unacceptably large amounts. A possible solution to this problem, the use of small drift gyros, is economically prohibitive in many cases.

SUMMARY AND OBJECTS OF THE INVENTION

It is therefore the object of the invention to provide a navigation method that will maintain course error at an acceptable level in the event of a failure of the course support.

The preceding and other objects are achieved in the present invention that provides a method for determining the course of an aircraft of the type that includes at least one gyro and an external, calibrated magnetic course sensor in the event of the failure of such magnetic course sensor. Such method begins by measuring true north course with such magnetic sensor, measuring local magnetic variation, correcting the true north course by combining such variation with such measured true north course and determining differential angle from gyro drift, the earth's rotation and latitude. Course angle $\psi$ A is independently determined continuously from the corrected true north course and the differential angle. Thereafter, the independent course angle values are stored and true north course is calculated by correcting the independent course with the differential angle determined prior to the failure of said magnetic course sensor.

The foregoing features and advantages of the present invention will become further apparent from the detailed written description and the accompanying drawing figure which follow.

BRIEF DESCRIPTION OF THE DRAWING

The FIGURE is a schematic illustration, in block diagram form, of the method of operation of the invention.

DETAILED DESCRIPTION

Generally, in a course support failure of a magnetic course sensor, the "directional gyro" mode of operation (i.e. determination of the course by means of the low quality gyro inertial system) is invoked. (The expressions "failure of the magnetic course sensor" and "failure of the course support" include any obligatory shutdown of themagnetic course sensor occasioned by the existence of flight attitude and dynamics that render such sensor no longer capable of acceptably accurate measurement.) Unfortunately, this leads to significant navigation inaccuracies as large gyro drifts distort the course. For example, by employing a properly calibrated magnetic field probe (e.g. a magnetometer or a flux valve) and taking the local magnetic variation or declination into consideration, true north course can be determined to an accuracy of $0.3°1\sigma$. In contrast the course accuracy, independently determined by an inertial system of $0.3°/h$. gyro drift and a latitude of $50°$ is only $18°1\sigma$. By utilizing the method of the invention, even after sensor failure, course can be determined with great approximated accuracy. Further, true north course can be determined from the magnetic course sensor by consideration of local magnetic variation. Despite a failure of the magnetic course sensor, it is therefore also possible to determine course with approximately the original accuracy, particularly in the case of a speed-supported gyro system. The method of the invention is based upon the following relationships:

$$\psi_m + \delta(\phi, \lambda) = \psi = \delta\psi + \psi_A \quad (1)$$

$$\delta\psi = \epsilon/(\Omega \cdot \cos \phi) \quad (2)$$

where
 $\epsilon$ = gyro drift
 $\Omega$ = rate of rotation of the earth (angular velocity of the earth)
 $\psi_m$ = magnetic course
 $\delta(\phi, \lambda)$ = local magnetic variation (declination)
 $\psi$ = true north course
 $\psi_A$ = independently determined course (e.g. by a strapdown gyro system)
 $\phi$ = latitude
 $\lambda$ = longitude The differential angle $\delta\psi$ is determined, in accordance with equation 2, from the gyro drifts $\epsilon$, the angular velocity of the earth $\Omega$ and the latitude $\phi$. To obtain the differential angle $\delta\psi$ in accordance with the invention, true north is determined with the magnetic course sensor by adding the local magnetic variation $\delta(\phi,\lambda)$, and the differential angle $\delta\psi$ is derived from the gyro drift. Latitude is determined through comparison with the independently-determined course. Through continuous determination (observation) of the differential angle $\delta\psi$ over time, an average differential angle $\delta$ may be derived. This average value is stored for a specified period of time. As a consequence, true north course can be determined, in the event of failure of the magnetic course sensor, from the independently determined course and the most recent average differential angle $\delta\psi$ by extrapolation in view of the instantaneous latitude, from equation 1 above-described method of the invention is illustrated in the FIGURE in block diagram form.

As a result of the above-described method, the accuracy of determination of the true north is increased by the average differential angle $\delta\psi$ over a course determined independently by a gyro system that is subject to drift.

The method of the invention may be advantageously employed in a variety of vehicles generally deemed "aircraft" and including fixed wing and rotor aircraft as well as other manned and unmanned flight vehicles.

While this invention has been described with reference to its presently preferred embodiment, it is not limited thereto. Rather, the scope of the invention is only limited insofar as defined by the following set of claims ad includes all equivalents thereof.

What is claimed is:

1. A method for determining the course of an aircraft of the type that includes at least one gyro and an external calibrated magnetic course sensor in the event of failure of said magnetic course snsor, said method comprising the steps of:
   (a) measuring true north course by means of said magnetic sensor; and
   (b) measuring local magnetic variation; then
   (c) correcting said true north course by combining said magnetic variation with said measured true north course; and
   (d) determining the differential angle from gyro drift, the earth's rotation and latitude; and
   (e) independently continuously determining course angle $\psi_A$ from said corrected true north course and said differential angle; then
   (f) storing said independent course angle; and then;
   (g) calculating true north course by correcting said independent course with, the differential angle determined prior to failure of said magnetic course sensor.

2. A method as defined in claim 1 wherein said magnetic sensor is a calibrated three-axis magnetometer.

3. A method as defined in claim 1 wherein said magnetic sensor is a calibrated flux valve.

4. A method as defined in claim 1 further including the steps of:
   (a) calculating said correction differential angle by averaging a plurality of values of said differential angle $\delta\psi$ over a predetermined period of time; then
   (b) extrapolating said averaged differential angle corrected according to instantaneous latitude.

5. A method as defined in claim 1 further including the step of compensating the speed-dependent errors of said independent course determination by means of a speed reference.

6. A method as defined in claim 5 wherein said speed reference is a Doppler radar.

* * * * *